United States Patent
Witschorik

(10) Patent No.: US 6,377,690 B1
(45) Date of Patent: *Apr. 23, 2002

(54) SAFE TRANSMISSION OF BROADBAND DATA MESSAGES

(75) Inventor: C. A. Witschorik, Naperville, IL (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,272

(22) Filed: Sep. 14, 1998

(51) Int. Cl.[7] ............................................... H04N 7/167
(52) U.S. Cl. .................... 380/268; 380/210; 380/270; 380/33; 713/150
(58) Field of Search ................................ 380/210, 268, 380/270, 33; 713/150

(56) References Cited

U.S. PATENT DOCUMENTS 4,972,479 A * 11/1990 Tobia, Jr. et al. ............. 380/33
5,392,354 A * 2/1995 Takahashi et al. ............. 380/23
5,920,626 A * 7/1999 Durden et al. ................. 380/10

FOREIGN PATENT DOCUMENTS

| GB | 2222057 | 2/1990 | ............. H04L/9/00 |
| WO | WO9825372 | 6/1998 | |

* cited by examiner

Primary Examiner—Christine T. Tu
Assistant Examiner—Todd Jack
(74) Attorney, Agent, or Firm—Werner Ulrich

(57) ABSTRACT

An arrangement for providing secure transmission of information. The bulk of the information is transmitted over non-secure channels such as broadcast media which terminate on a plurality of receiving stations. However, a residue of data is transmitted over a protected channel, such as a point-to-point channel, established for example, by a telephone connection. Interception of a complete message, when only the bulk of the message is available, becomes very difficult. It becomes even more difficult if scrambling arrangements are used to select the particular bits of the data message that are transmitted over the secure channel. It becomes still more difficult, if the data transmitted over the secure channel, itself, alters the scrambling algorithm.

4 Claims, 1 Drawing Sheet

SAFE TRANSMISSION OF BROADBAND DATA MESSAGES

TECHNICAL FIELD

This invention relates to methods and apparatus for transmitting data messages in such a way that interception is virtually impossible.

PROBLEM

With the increased use of the Internet, and especially of the Internet as used to transmit broadband data signals, the necessity for avoiding unauthorized interception of such messages becomes ever more critical. Methods have been proposed using a decryption key which is reliably transported to a destination. A message that has been encrypted using a corresponding encryption key, and sent over an interceptible medium, then requires that the message be decrypted by an authorized recipient, who has the key, or an unauthorized recipient, who does not have the key. Various encryption schemes have been proposed, but the ever increasing power of modern computers makes unauthorized decryption an ever increasing threat. Much of the information from the Internet will be broadcast into a plurality of homes over a shared medium such as a co-axial cable, an optical fiber cable, or wireless, having the characteristic that it is easy for unauthorized recipients to intercept the raw signal that is not destined for them. A problem of the prior art, therefore, is that it is difficult to prevent unencrypted signals which are broadcast to a plurality of destinations from being illegally intercepted by an unwanted destination; even intercepted encrypted messages may no longer be safe from decryption by unwanted users.

SOLUTION

The above problem is solved, and an advance is made over the prior art in accordance with this invention wherein a fraction of the data that is to be transmitted from a source to a destination is withheld from a broadcast medium, and is instead transmitted over a more secure and private medium such as a telephone connection; the data received over the broadcast medium is then combined with the data that had been withheld from the broadcast medium, but transmitted over the secure medium in order to derive the complete data message. Advantageously, such an arrangement makes decryption essentially impossible since the interceptor cannot access the full data of the data message. In many cases, the secure connection exists as an upstream connection for controlling the source of the data message; by using this upstream connection as a two-way connection, a separate downstream connection is conveniently formed to convey the data that had been withheld from the broadcast medium.

In accordance with one embodiment of the invention, the full data is first scrambled before a regular and repetitive portion of the data is extracted to be withheld from the broadcast medium, and to be transmitted over the secure medium. Advantageously, such an arrangement makes partial decryption much more difficult.

DETAILED DESCRIPTION

Figure 1:
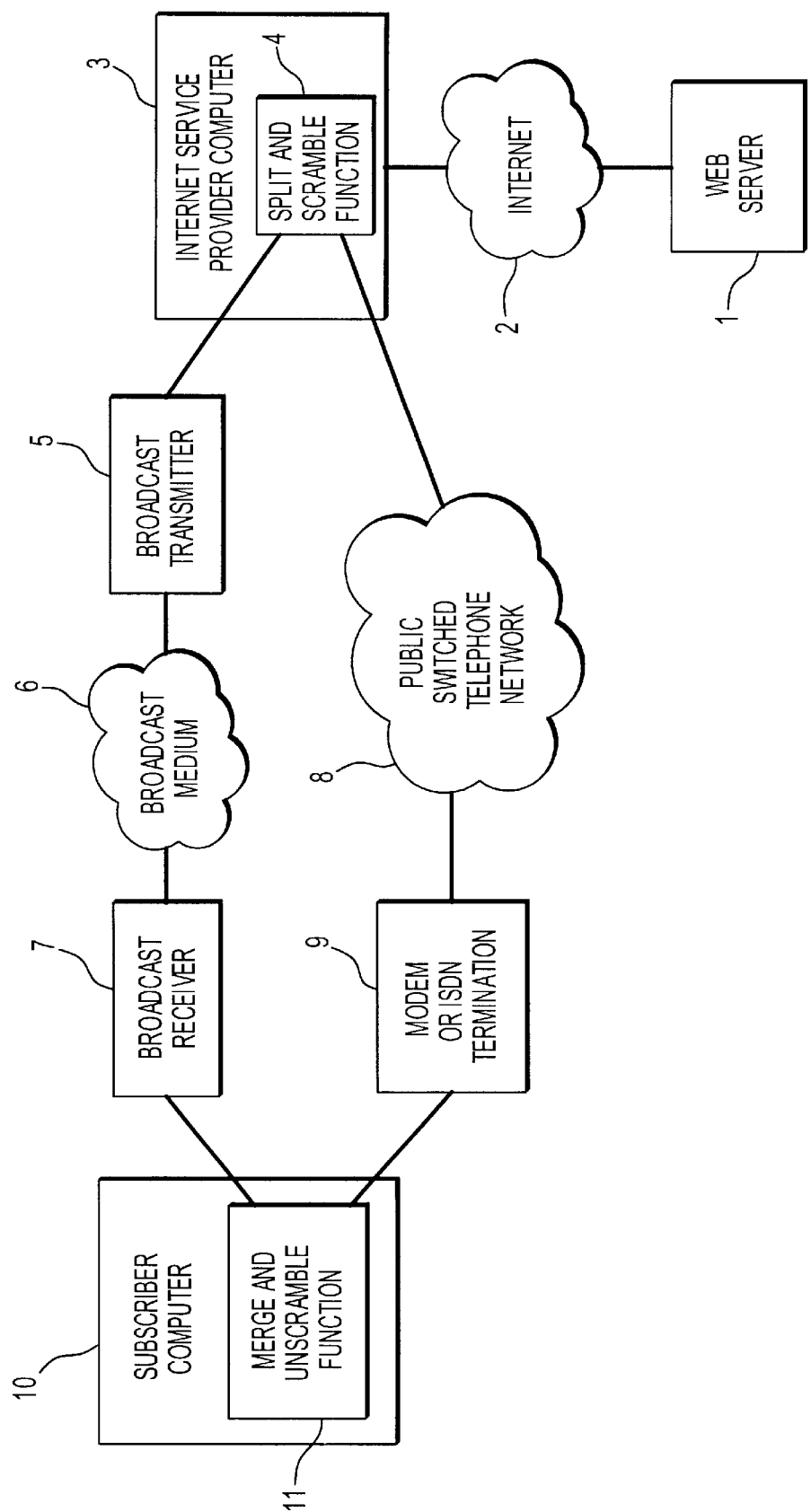
FIG. 1 is a block diagram, illustrating the principles of Applicant's invention.

FIG. 1 is a block diagram illustrating the operation of the invention. A source of the data message 1, such as a Web Server, transmits a data message over the Internet to an Internet Service Provider (ISPN) Computer 3. The Computer includes software, or hardware for performing a split and scramble function 4, and the split signal is then sent partly to the broadcast transmitter 5, and partly over the point-to-point public switched telephone network 8. The bulk of the data goes to the broadcast transmitter 5, which transmits this data over a broadcast medium 6 (such as a co-axial cable, a fiber optic cable, a radio channel, and a combination of ones of these media). From the broadcast medium, a broadcast receiver 7 receives the broadcast portion of the data signal. The public switched telephone network 8 transmits the non-broadcast portion to a modem, or an integrated services digital network (ISDN) termination 9. The output of the broadcast receiver 7 and the modem, or ISDN termination, is transmitted to a subscriber computer 10 which includes a merge and unscramble function 11, to combine the two signals in order to reconstitute the original data signal.

The connection from the subscriber computer to the ISP computer, and thence to the source of the data, is made in the course of establishing the connection between the subscriber computer and the source. The source being identified by a URL (Universal Resource Locator) number. This makes the use of this arrangement very practical since no extraneous connections are required.

In order to make the scheme even more foolproof, the data that is transmitted over the secure channel can be used to specify the splitting arrangement. For example, suppose that every 19th bit is transmitted over the secure channel; initially the first bit that is received over the secure channel could be inserted into the 10th bit position of the 19 bits received from both the secure and non-secure channel. Then, if that bit is zero, a subsequent bit received over the secure channel, could be inserted in the 11th bit of the next group of 19 bits transmitted over the secure and non-secure channel. If the bit received over the secure channel were a 1, then the next bit received over the secure channel would be inserted in the 9th position of the next group of 19 bits transmitted over the secure and non-secure channel. Thus, the secure information actually specifies the splitting arrangement between the secure and the non-secure information, greatly increasing the difficulty of successfully intercepting and decrypting the transmitted information. The splitting and merging operations are, of course, synchronized.

Alternatively, or additionally, the segments of the total message can be scrambled. With simple scrambling, the order of bits is changed in each segment before transmitting; the unscrambling process then reorders the received bits of each segment to be in the original order, with the bit received over the secure channel being inserted in a fixed position of each segment.

Alternatively, scrambling itself may be influenced by the content of the secure channel. For example, if the secure channel signal is a 1, then a first scrambling algorithm is used on the data of a corresponding, or succeeding segment over the non-secure channel; if it is 0, a second scrambling algorithm. Multiple scrambling algorithms based on several bits of the secure channel can also be used.

Scrambling and splitting according to the contents of the secure channel can be combined. For example, the splitting arrangement described above can precede a scrambling operation prior to transmitting a scrambled segment over the non-secure channel. The contents of the non-secure channel are then unscrambled at the receiver and the bit received over the secure channel is inserted into its appropriate position in accordance with the insertion scheme described above.

On top of the technique for splitting in accordance with data transmitted over the secure channel and/or the scrambling technique, both described above, the whole message can be encrypted, thus, further complicating the task of the interceptor. Even without encryption, if the secure channel remains secure, and the splitting period is not the same as the period of sub-sections of the data, (e.g., one byte long), the encryption of a message based on the broadcast channel information only, should continue to be very difficult.

Many variations of the preferred embodiment will be apparent to those of ordinary skill in the art. The invention is limited only by the attached Claims.

What is claimed is:

1. Apparatus for transmitting data comprising:
    a non-secure connection for transmitting the bulk of the data;
    a secure connection for transmitting the residue of the data;
    means for splitting a data signal into a first signal representing the bulk of the data, and a second signal representing the residue of the data;
    means for combining the first signal and the second signal into a combined signal representing all of the data;
    wherein said means for splitting the data, transmits the bulk of the data over said non-secure connection, and transmits the residue of the data over said secure connection; characterized in that:
        the means for splitting the data signal performs a split that is dependent on the contents of the data transmitted by the second signal;
        wherein neither the first signal nor the second signal contains information that is independently interpretable;
        wherein said second signal transmits information to complete information transmitted by said first signal.

2. The apparatus of claim 1, further characterized in that:
    said means for splitting, comprises means for scrambling the entire said first signal according to an algorithm dependent on the contents of the data transmitted by the second signal, said second signal representing said residue of the data being transmitted.

3. A method for reliably transmitting and receiving data comprising the steps of:
    splitting a data signal representing said data into a first signal representing the bulk of the data, and a second signal representing the residue of the data;
    transmitting the first signal over an unprotected medium;
    transmitting the second signal over a protected medium;
    receiving the first and second signals; and
    combining the first signal and the second signal into a combined signal representing said data; characterized in that:
        said step of splitting said data signal comprises the step of splitting the data signal dependent on the contents of the data transmitted by the second signal;
        wherein neither the first signal nor the second signal contains information that is independently interpretable.
        wherein said second signal transmits information to complete information transmitted by said first signal.

4. The method of claim 3, further characterized in that:
    the step of splitting said data signal comprises scrambling the entire said first signal according to an algorithm dependent on the contents of the data transmitted by the second signal, said second signal representing said residue of the data being transmitted.

* * * * *